(12) United States Patent
Chuk et al.

(10) Patent No.: US 7,190,769 B2
(45) Date of Patent: Mar. 13, 2007

(54) APPARATUS FOR CONTROLLING OPERATION OF A RECORDING DEVICE WITH A TELEPHONE INSTRUMENT

(75) Inventors: Ko Chuk, Hong Kong (HK); Tu Tian Tian, Guang Dong (CN)

(73) Assignee: Radioshack Corporation, Fort Worth, TX (US)

( * ) Notice: Subject to any disclaimer, the term of this patent is extended or adjusted under 35 U.S.C. 154(b) by 627 days.

(21) Appl. No.: 10/456,390

(22) Filed: Jun. 7, 2003

(65) Prior Publication Data

US 2004/0247087 A1 Dec. 9, 2004

(51) Int. Cl.
*H04M 1/64* (2006.01)
(52) U.S. Cl. .................. 379/74; 379/377; 379/384; 379/385; 379/390.03; 379/392; 379/394; 379/398
(58) Field of Classification Search .............. 379/385, 379/390.03, 392.01, 74
See application file for complete search history.

(56) References Cited

U.S. PATENT DOCUMENTS 4,446,338 A * 5/1984 Rosch ...................... 379/385
4,700,380 A * 10/1987 Ahuja ...................... 379/177
4,811,389 A * 3/1989 Balch ...................... 379/377
5,506,891 A * 4/1996 Brown .................. 379/100.06

* cited by examiner

*Primary Examiner*—Fan Tsang
*Assistant Examiner*—Hemant S. Patel
(74) *Attorney, Agent, or Firm*—Law Office of Donald D. Mondul

(57) ABSTRACT

An apparatus for controlling operation of a recording device with a telephone configured for orientation in a first state and a second state includes: (a) an information conveying section for conveying information from the telephone to a recording locus in the recording device; (b) an indicating section for receiving a monitor signal having a first value when the telephone is in the first state and having a second value when the telephone is in the second state; the indicating section employs a single fixed bias to generate a first indicating signal when the telephone is in the first state and to generate a second indicating signal when the telephone is in the second state; and (c) an engaging section; the engaging section responds to the first and second indicating signals to orient the recording device for recording the information or for not recording.

16 Claims, 2 Drawing Sheets

APPARATUS FOR CONTROLLING OPERATION OF A RECORDING DEVICE WITH A TELEPHONE INSTRUMENT

BACKGROUND OF THE INVENTION

The present invention is directed to apparatuses for controlling operation of a recording device with a telephone instrument, and especially to apparatuses for controlling operation of a voice recorder device, such as a tape recorder, with a telephone instrument.

There are times when it is useful to record information received over a local loop by a telephone instrument or similar device. An example of such an occasion is a business conference call for which minutes are to be prepared. It is useful if the operation of the telephone instrument and the recording device can be coordinated in order to minimize the complexity of the recording effort and to maximize the quality of the recording. For example, using a microphone next to a telephone to pick up conversation introduces distortion, static and other recording degradations into the recorded conversation.

Telephone recorder controllers are known that permit connection among a local loop, a telephone instrument and a recording device. Such prior art telephone recorder controllers connect the local loop to the controller, and connect the recorder and phone to the controller. By connecting the local loop to the MIC jack of a recording device and connecting the controller to the REMOTE jack of the recording device, when the recording device was set to RECORD, the recorder would automatically start to record information received at the MIC jack when the telephone instrument was taken off hook.

Prior art controllers provide a voltage selection switch for establishing a proper impedance interface between the controller and the telephone instrument. Improper setting of the voltage selection switch would likely result in improper operation of the controller and the recording device. Such manual setting of a voltage selection switch introduces inconvenience and a source of human error to operation of the controller apparatus.

Recorder controllers generally rely upon DC power supply from a connected recording device. Accordingly, prior art controllers also provide a polarity selection switch to set the polarity of the output of the controller correctly vis-à-vis the polarity of the voltage presented by the recording device to the controller apparatus. Improper setting of the polarity selection switch would also likely result in improper operation of the controller and the recording device. Such manual setting of a polarity selection switch introduces further inconvenience and another source of human error to operation of the controller apparatus.

There is a need for a telephone recorder controller apparatus that operates automatically without requiring a user to set switches to establish operating parameters of the controller. Such an improved telephone recorder controller apparatus would operate more reliably because the element of human error would be reduced.

SUMMARY OF THE INVENTION

An apparatus for controlling operation of a recording device with a telephone configured for orientation in a first state and a second state includes: (a) an information conveying section for conveying information from the telephone to a recording locus in the recording device; (b) an indicating section for receiving a monitor signal having a first value when the telephone is in the first state and having a second value when the telephone is in the second state; the indicating section employs a single fixed bias to generate a first indicating signal when the telephone is in the first state and to generate a second indicating signal when the telephone is in the second state; and (c) an engaging section; the engaging section responds to the first and second indicating signals to orient the recording device for recording the information or for not recording.

There is a need for an apparatus for controlling operation of a recording device with a telephone instrument that operates automatically without requiring a user to set switches to establish operating parameters of the controller.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
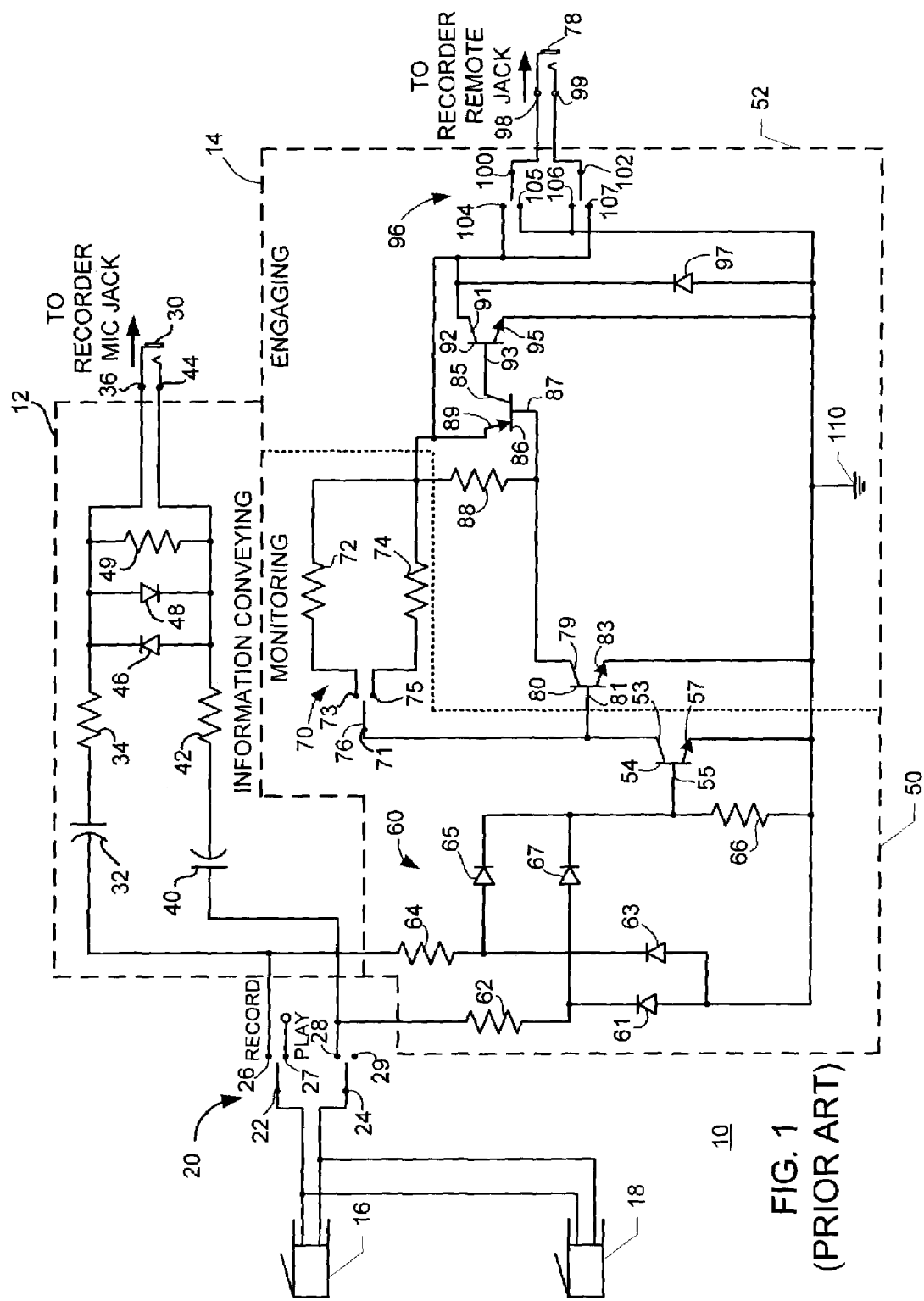
FIG. 1 is a simplified electrical schematic diagram of a representative prior art telephone recorder control apparatus.

FIG. 1 is a simplified electrical schematic diagram of a representative prior art telephone recorder control apparatus. In FIG. 1, a telephone recorder control apparatus 10 includes an information conveying section or circuit 12 and a control section or circuit 14. Apparatus 10 is coupled with a local loop (also sometimes referred to as a phone line; not shown in FIG. 1) and is connected with a telephone instrument or device (not shown in FIG. 1) via connectors 16, 18. Connectors 16, 18 are connected with apparatus 10 via a switch 20. Switch 20 is a double-pole-double-throw switch that has two positions: RECORD and PLAYBACK. When switch 20 is in a RECORD position, poles 22, 24 are electrically connected with RECORD poles 26, 28. When switch 20 is in a PLAYBACK position, poles 22, 24 are electrically connected with PLAYBACK poles 27, 29. Operating a recorder (not shown in FIG. 1) in PLAYBACK mode is not affected by the present invention, and such PLAYBACK operations will not be discussed except to point out that switch 20 must be oriented in its PLAYBACK position with poles 22, 24 electrically connected with PLAYBACK poles 27, 29 to carry out PLAYBACK operations with the recorder while the recorder is connected with apparatus 10.

Information conveying circuit 12 is coupled with RECORD poles 26, 28 and with a recording locus in an attached recorder (not shown in FIG. 1). Electrical connection between the attached recorder and information conveying circuit 12 is effected via a MIC jack in the recorder receiving a connection plug 30. Typical recording devices are configured to record signals, such as voice signals, received at a MIC jack so long as the recorder is configured for a RECORD mode of operation.

Information conveying circuit 12 includes a capacitor 32 connected with RECORD pole 26 and coupled in series with a resistor 34 and with a first output pin 36. A capacitor 40 is connected with RECORD pole 28 and coupled in series with a resistor 42 and with a first output pin 44. Diodes 46, 48 and a resistor 49 are coupled in parallel between output pins 36, 44. Connection plug 30 is connected with output pins 36, 44.

Control circuit 14 includes a monitoring section 50, and an engaging section 52. Monitoring section 50 is coupled with RECORD poles 26, 28 for monitoring voltage across RECORD poles 26, 28, and thereby to monitor voltage presented by the connected telephone instrument (not shown in FIG. 1) to the local loop (not shown in FIG. 1) to which the telephone instrument and apparatus 10 are connected. Monitoring section 50 includes a first bipolar transistor 54 having a collector 53, a base 55 and a emitter 57. A network 60 establishes a potential at base 55 that is determined by voltage appearing at RECORD poles 26, 28. Network 60 includes diodes 61, 63, 65, 67 and resistors 62, 64, 66. When the connected telephone instrument (not shown in FIG. 1) is on hook, impedance across RECORD poles 26, 28 is preferably more than 10 Mohm. Accordingly, only a very small current may be applied to base 55 of transistor 54. Collector current at emitter 57 of transistor 54 is proportional to base current and is therefore small. A bias network 70 is coupled with collector 53 so that different resistance values may be applied to collector 53 in order to present the required low collector current at collector 53 when various DC voltage levels are provided from a connected recording device (not shown in FIG. 1) to power apparatus 10. Bias network 70 includes resistors 72, 74 connected with a selector switch 76. Selector switch is coupled with collector 53 of transistor 54 and can be oriented in a first position electrically connecting poles 71, 73 to couple resistor 72 with collector 53 or oriented in a second position electrically connecting poles 71, 75 to couple resistor 74 with collector 53. In the representative embodiment illustrated in FIG. 1, resistors 72, 74 may be appropriately valued, for example, to accommodate an attached recorder being powered by a 3 volt or a 6 volt power supply. Additional resistors may be included in bias network 70 to accommodate other power levels received from an attached recorder.

Engaging section 52 is coupled with monitoring section 50 and with a REMOTE jack of an attached recording device (not shown in FIG. 1) via a connection plug 78. Engaging section 52 includes a second bipolar transistor 80 having a collector 79, a base 81 and an emitter 83. Engaging section 52 also includes a third bipolar transistor 86 having a collector 85, a base 87 and an emitter 89, and a fourth bipolar transistor 92 having a collector 91, a base 93 and an emitter 95. A switch 96 is connected between transistors 86, 92 and output pins 98, 99. Connection plug 78 is connected with output pins 98, 99.

Base 81 of transistor 80 is connected with collector 53 of transistor 54 and with bias network 70. Base 87 of transistor 86 is connected with collector 79 of transistor 80 and with bias network 70 via a resistor 88. Because transistors 86, 92 are bipolar transistor, transistors 86, 92 depend upon proper biasing for proper operation. As a consequence, the polarity of signals applied across transistors 86, 92 is critical to assure proper operation of apparatus 10. That is, because apparatus 10 operates using DC voltage provided by a connected recording device (not shown in FIG. 1), polarity presented by apparatus 10 at output terminals 98, 99 must match polarity presented by the connected recording device to output terminals 98, 99. A diode 97 is connected between collector 91 and ground 110 to assure no damage is caused to transistor 92 by applying reverse polarity signals across transistor 92. Switch 96 is included in engaging section 52 to accommodate different polarities so that apparatus 10 may operate properly. Thus, switch 96 may be switched to a first orientation to accommodate signals having a first polarity by engaging poles 100, 102 with poles 104, 106. Switch 96 may be switched to a second orientation to accommodate signals having a second polarity by engaging poles 100, 102 with poles 105, 107.

Voltage across a telephone line (i.e., a local loop) is normally 48 volts when a connected telephone instrument is in an on hook state. In an off hook state, the voltage presented to the local loop is in the range of 6–15 volts. Typically, when a telephone recorder controller (such as apparatus 10) detects less than 20 volts across the local loop, a transistor is turned on to short the terminals of a REMOTE plug. The REMOTE jack of a recorder is like a switch; when the switch is closes, the recorder is turned on and when the switch is open, the recorder turns off.

When a telephone instrument (not shown in FIG. 1) connected with apparatus 10 is on hook, transistor 54 is turned on. When transistor 54 is turned on, base 81 of transistor 80 is pulled down toward ground 110. In this orientation, transistors 86, 92 are turned off, and output pins 98, 99 are an open circuit. The terminals of the REMOTE plug are not shorted so the connected recorder is turned off. When the telephone instrument connected with apparatus 10 is off hook, voltage across the local loop drops and base 55 of transistor 54 is lowered. Transistor 54 turns off and transistor 80 turns on. Transistors 86, 92 also turn on so long as switch 96 is oriented to present proper polarities across transistors 86, 92. When transistors 86, 92 turn on output pins 98, 99 are shorted together, terminals of the REMOTE plug (i.e., connection plug 78) are shorted and the connected tape recorder is turned on, thereby permitting recording of information presented to the MIC jack of the connected recording device via connection plug 30.

In addition to the inconvenience of requiring a user to set a proper operating voltage using switch 76 and requiring a user to set a proper operating polarity by using switch 96, another shortcoming exists with apparatus 10. When output terminals 98, 99 are shorted to turn on a connected recorder, there is a 0.7–0.8 volt drop between collector 91 and emitter 95 of transistor 92. This means that supply voltage to the connected recorder is reduced. If, for example, a connected recorder is powered by two 1.5 volt batteries, the voltage drop across transistor 92 is significant and may cause the connected recorder to operate improperly or to not operate at all.

Figure 2:
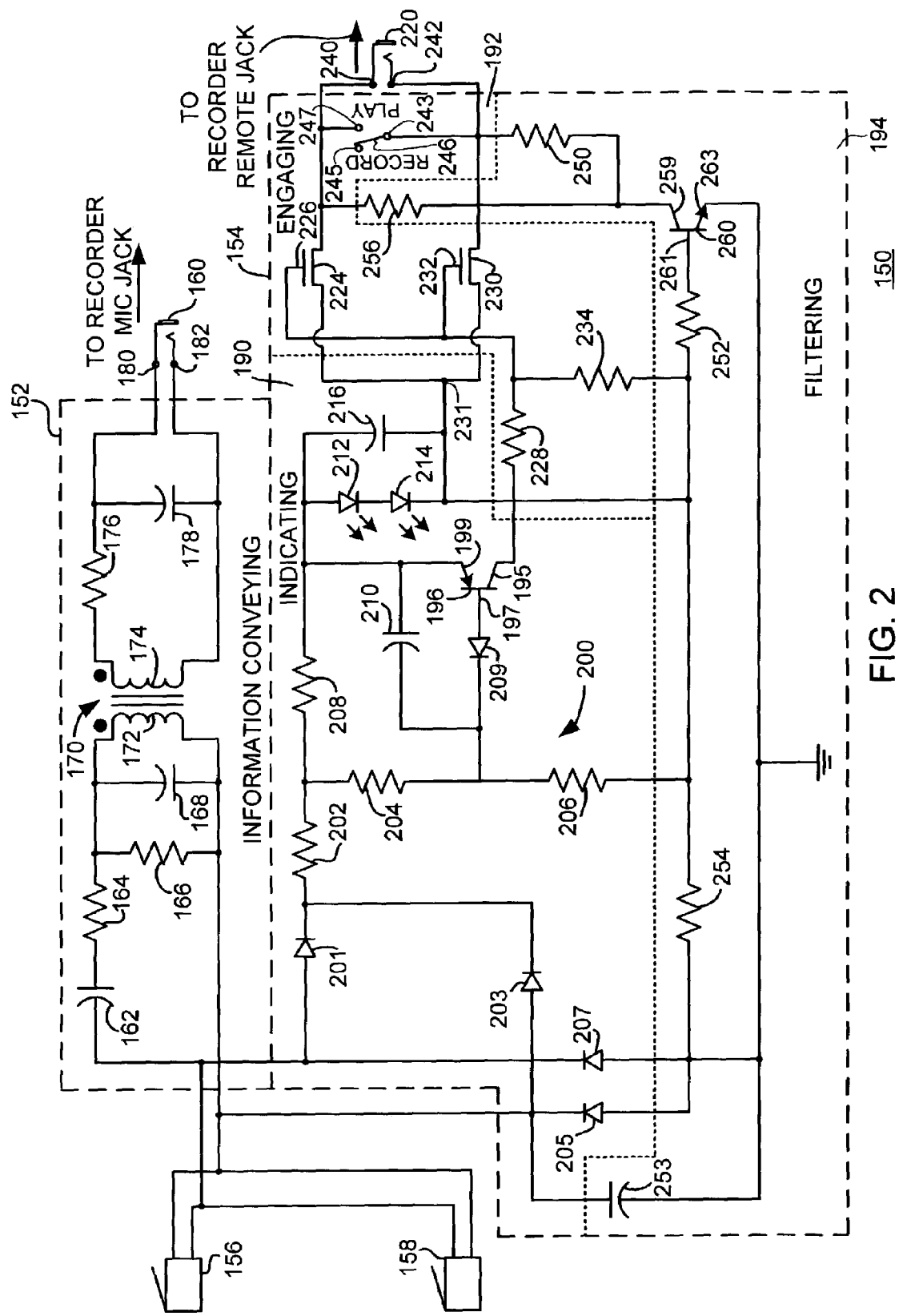
FIG. 2 is a simplified electrical schematic diagram of a telephone recorder control apparatus according to the present invention.

FIG. 2 is a simplified electrical schematic diagram of a telephone recorder control apparatus according to the present invention. In FIG. 2, a telephone recorder control apparatus 150 includes an information conveying section or circuit 152 and a control section or circuit 154. Apparatus 150 is coupled with a local loop (also sometimes referred to as a telephone line; not shown in FIG. 2) with a telephone instrument or device (not shown in FIG. 2) via connectors 156, 158. Information conveying circuit 152 is coupled with connectors 156, 158 and with a recording locus in an attached recorder (not shown in FIG. 2). Electrical connection between the attached recorder and information conveying circuit 152 is effected via a MIC jack in the recorder receiving a connection plug 160. Typical recording devices are configured to record signals received at a MIC jack so long as the recorder is configured for a RECORD mode of operation.

Information conveying circuit 152 includes a capacitor 162 coupled in series with a resistor 164 and with a first transformer side 172 of a transformer 170. A capacitor 166 and a resistor 168 are coupled in parallel with first transformer side 172. Information conveying circuit 152 also includes a resistor 176 coupled with a second transformer side 174 of transformer 170 and with a first output pin 180. A capacitor 178 is coupled in parallel with output pins 180, 182. Connection plug 160 is connected with output pins 180, 182. Transformer 170 couples audio signals from a connected telephone device (not shown in FIG. 2) with connection plug 160. Capacitors 162, 168, 178 and resistors 164, 166, 176 cooperate to isolate DC signals from and filter noise from information signals traversing information section 152 from connectors 156, 158 to connection plug 160.

Control circuit 154 includes an indicating section 190, an engaging section 192 and a filtering section 194. Indicating section 190 is coupled with the connected local loop (not shown in FIG. 2) and with the connected telephone instrument or device (not shown in FIG. 2) via connectors 156, 158 to monitor voltage presented by the connected telephone instrument to the connected local loop. Indicating section 190 includes a first bipolar transistor 196 having a collector 195, a base 197 and an emitter 199. A network 200 establishes a potential at base 197 that is determined by the voltage across the local loop at connectors 156, 158. Network 200 includes diodes 201, 203, 205, 207, 209, resistors 202, 204, 206, 208 and a capacitor 210.

At least one solid state voltage drop devices are employed to set a voltage drop across transistor 196 to configure transistor 196 for use as a voltage detecting device. In the preferred embodiment of the present invention illustrated in FIG. 2, two light emitting diode (LED) devices 212, 214 and a capacitor 216 cooperate to configure transistor 196 as a voltage detecting device. LED devices act as Zener diode devices to provide a voltage reference of approximately 2.5 volts for transistor 196. LED devices are particularly useful in such a configuration because the forward voltage of an LED device is stable even when carrying a small current.

Engaging section 192 is coupled with monitoring section 190 and with a REMOTE jack of an attached recording device (not shown in FIG. 2) via a connection plug 220. Engaging section 192 includes MOSFETs (Metal Oxide Semiconductor Field Effect Transistor) 228, 230. MOSFET 224 has a gate 226. MOSFET 230 has a gate 232. Gates 226, 232 are connected in common with collector 195 of transistor 196 via a resistor 228. Resistors 228, 234 cooperate to set the voltage level applied to gates 226,232. MOSFETS 224, 230 are coupled with output pins 240, 242. MOSFETs 224, 230 are also coupled with a common locus 231. A switch 246 controls whether apparatus 150 is oriented for RECORD operation or oriented for PLAYBACK operation.

Filtering section 194 is coupled with engaging section 192 and with indicating section 190. Filtering section includes resistors 250, 252, 254, 256, a capacitor 253 and a bipolar transistor 260. Transistor 260 has a collector 259, a base 261 and an emitter 263. Resistor 256 connects collector 259 with MOSFET 224. Resistor 250 connects collector 259 with MOSFET 230. Switch 246 connects output pins 240, 242. Resistors 252, 254 cooperate in setting bias for base 261. Capacitor 253 is coupled with emitter 263 and participates in filtering operations of filtering section 194. If a connected recording device (not shown in FIG. 2) is powered by an alternating current (AC) adapter, filtering section 194 is configured to filter AC noise (e.g., a 60 Hz AC line signal) from traversing apparatus 150, and avoid having AC noise interfere operation of indicating section 190 An advantage of the present invention over prior art telephone recorder control apparatuses is provided by employing MOSFETs 224, 230 in engaging section 192: appropriate shorting of output pins 240, 242 to activate a connected recording device is effected whether polarity of the connected recording device matches the polarity of apparatus 150 or not. This eliminates requiring user participation in setting polarity of the apparatus 150 that was necessary in prior art such devices (e.g., apparatus 10; FIG. 1).

Recall that for prior art controllers which employ a bipolar transistor as switch (e.g., transistor 92; FIG. 1), the transistor thus employed must draw current from a connected recording device to drive the transistor. As a result, a voltage drop of 0.7 volt across the transistor base and emitter (e.g., base 93, emitter 95; FIG. 1) will necessarily occur. MOSFETs 224, 230 do not place such a large voltage across output pins 240, 242. Operating voltage of apparatus 150 is not materially affected when output pins 240, 242 are shorted. Further, no voltage selection switch is required to be set by a user to match operating voltage of apparatus 150 with operating voltage of a connected recording device (as in the case of switch 76; FIG. 1).

In operation, the improved accuracy of voltage detection provided by LEDs 212, 214 assure that when a connected telephone device is in an on hook state, the voltage at base 197 of transistor 196 is higher than 2.5 volts (the threshold set by LEDs 212, 214), so transistor 196 is turned off and gates 226, 232 of MOSFETs 224, 230 are near zero. When a connected telephone device is off hook, the voltage across the local loop (sensed at connectors 156, 158) drops. Voltage at base 199 of transistor 196 also drops. Transistor 196 is turned on when voltage at base 197 drops to below 1.9V. When transistor 196 turns on, a voltage of 2.5 volts is applied to gates 226, 232 thereby gating MOSFETs 224, 230 and connecting output terminals 240, 242 in common at locus 231. Output terminals 240, 242 thereby short REMOTE terminals of a connected recording device.

In order for apparatus 150 to effect control of a connected recording device, switch 246 must be positioned in the RECORD orientation with switch 246 connecting poles 243, 245. This opens output pins 240, 242, so that gating of MOSFETS 224, 230 controls when output pins 240, 242 are connected or closed, thereby controlling supply of power to a connected recording device. When apparatus 150 is in the RECORD orientation a connected recording device will automatically start to record if output pins 240, 242 are shorted (i.e., when MOSFETS 224, 230 are gated) so long as the connected recording device is set in its RECORD state (e.g., with its RECORD button depressed or otherwise actuated). When a user wishes to listen to recorded information, he should press the STOP button to disengage the RECORD function of the connected recording device and set switch 246 to a PLAY orientation connecting poles 243, 247. This connects or closes output pins 240, 242 so that supply of power to the connected recording device is no longer controlled by apparatus 150. When apparatus 150 is in the PLAY orientation (with switch 246 connecting poles 243, 247) the connected recording device is operated normally so that a user may rewind the tape (or otherwise reposition the recording medium) and play back the recorded information using actuators (e.g., control buttons) on the recording device.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following

We claim:

1. An apparatus for controlling operation of a recording device with a telephone instrument; said telephone instrument being configured for orientation in a first state and a second state; the apparatus comprising:
   (a) an information conveying section for conveying information from said telephone instrument to a recording locus in said recording device; said information conveying section being coupled with said telephone instrument and coupled with said recording locus;
   (b) an indicating section coupled with said telephone instrument; said indicating section receiving an operating voltage from said recording device and receiving a monitor signal from said telephone instrument; said monitor signal being at a first value when said telephone instrument is in said first state; said monitor signal being at a second value when said telephone instrument is in said second state; said indicating section employing a single fixed bias to generate a first indicating signal when said telephone instrument is in said first state and to generate a second indicating signal when said telephone instrument is in said second state regardless of value of said operating voltage; and
   (c) an engaging section coupled with said indicating section and coupled with a voltage control locus in said recording device; said engaging section responding to said first indicating signal to orient said voltage control locus to configure said recording device for recording said information received at said recording locus; said engaging section responding to said second indicating signal to orient said voltage control locus to configure said recording device for not recording.

2. An apparatus for controlling operation of a recording device with a telephone instrument as recited in claim 1 wherein said first state and said second state indicate line voltage across a local loop coupled with said telephone instrument, and wherein said engaging section is configured to operate regardless of polarity presented at of said line voltage control locus.

3. An apparatus for controlling operation of a recording device with a telephone instrument as recited in claim 1 wherein the apparatus further comprises a first filter section for filtering noise generated by said recording device; said first filter section being coupled with said engaging section.

4. An apparatus for controlling operation of a recording device with a telephone instrument as recited in claim 1 wherein said information conveying section includes a second filter section for filtering noise from said information traversing said information conveying section.

5. An apparatus for controlling operation of a recording device with a telephone instrument as recited in claim 2 wherein the apparatus further comprises a first filter section for filtering noise generated by said recording device.

6. An apparatus for controlling operation of a recording device with a telephone instrument as recited in claim 2 wherein said information conveying section includes a second filter section for filtering noise from said information traversing said information conveying section.

7. An apparatus for controlling operation of a recording device with a telephone instrument as recited in claim 3 wherein said information conveying section includes a second filter section for filtering noise from said information traversing said information conveying section.

8. An apparatus for controlling operation of a recording device with a telephone instrument as recited in claim 2 wherein said voltage control locus is coupled with a power supply of said recording device and wherein said engaging section has substantially no effect on said power supply in responding to said first and second indicating signals.

9. An apparatus for effecting an interface between a telephone device and a recording device for recording information received by said telephone device over a local loop; the apparatus comprising:
   (a) an information conveying circuit; said information conveying circuit being coupled with said telephone device and coupled with a recording locus in said recording device; said information conveying circuit conveying said information from said telephone device to said recording locus;
   (b) an indicating circuit; said indicating circuit receiving an operating voltage from said recording device; said indicating circuit being coupled with said telephone device and employing a single fixed bias for presenting a monitor signal indicating voltage presented to said local loop by said telephone device regardless of value of said operating voltage; said monitor signal having a first value when said voltage presented to said local loop by said telephone device is at a first value; said monitor signal having a second value when said voltage presented to said local loop by said telephone device is at a second value; and
   (c) an engaging circuit; said engaging circuit being coupled with said indicating circuit and coupled with a voltage control locus in said recording device; said engaging circuit orienting said voltage control locus in a first orientation when said monitor signal has said first value; said engaging circuit orienting said voltage control locus in a second orientation when said monitor signal has said second value; said recording device effecting recording of said information received at said recording locus when said voltage control locus is in said first orientation; said recording device not effecting recording when said voltage control locus is in said second orientation.

10. An apparatus for effecting an interface between a telephone device and a recording device for recording information received by said telephone device over a local loop as recited in claim 9 wherein said engaging circuit is configured to operate regardless of polarity presented at said voltage control locus.

11. An apparatus for effecting an interface between a telephone device and a recording device for recording information received by said telephone device over a local loop as recited in claim 9 wherein the apparatus further comprises a first filter circuit for filtering noise generated by said recording device; said first filter circuit being coupled with said engaging circuit.

12. An apparatus for effecting an interface between a telephone device and a recording device for recording information received by said telephone device over a local loop as recited in claim 9 wherein said information conveying circuit includes a second filter circuit for filtering noise from said information traversing said information conveying circuit.

13. An apparatus for effecting an interface between a telephone device and a recording device for recording information received by said telephone device over a local loop as recited in claim 10 wherein the apparatus further comprises a first filter circuit for filtering noise generated by said recording device; said first filter circuit being coupled with said engaging circuit.

14. An apparatus for effecting an interface between a telephone device and a recording device for recording information received by said telephone device over a local loop as recited in claim 10 wherein said information conveying circuit includes a second filter circuit for filtering noise from said information traversing said information conveying circuit.

15. An apparatus for effecting an interface between a telephone device and a recording device for recording information received by said telephone device over a local loop as recited in claim 11 wherein said information conveying circuit includes a second filter circuit for filtering noise from said information traversing said information conveying circuit.

16. An apparatus for effecting an interface between a telephone device and a recording device for recording information received by said telephone device over a local loop as recited in claim 10 wherein said voltage control locus is coupled with a power supply of said recording device and wherein said engaging circuit has substantially no effect on said power supply when effecting said first and second orientations.

* * * * *